May 16, 1944.  A. SCHREIBER  2,348,854
METHOD AND MEANS FOR PURIFYING SEWAGE AND THE LIKE
Filed Nov. 10, 1939  3 Sheets-Sheet 2
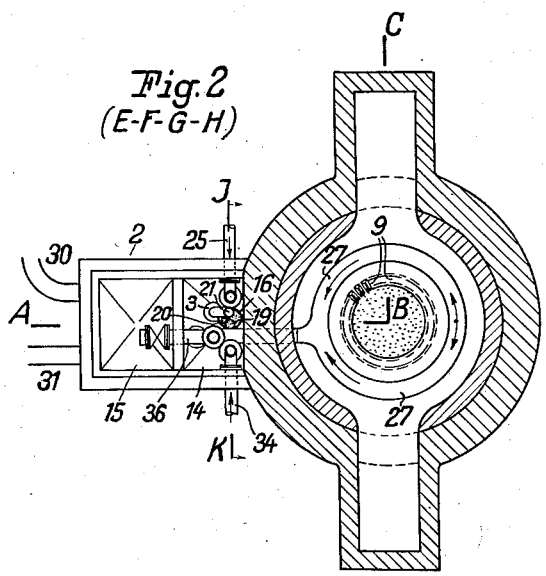
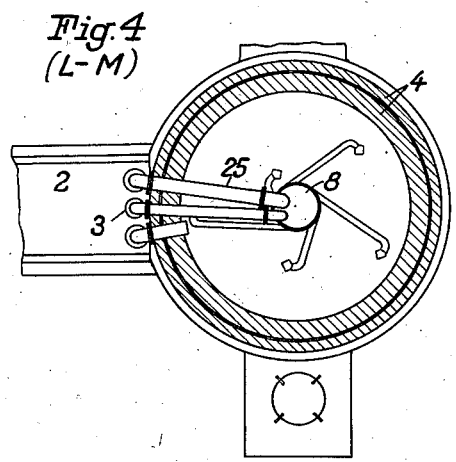
Inventor:
August Schreiber

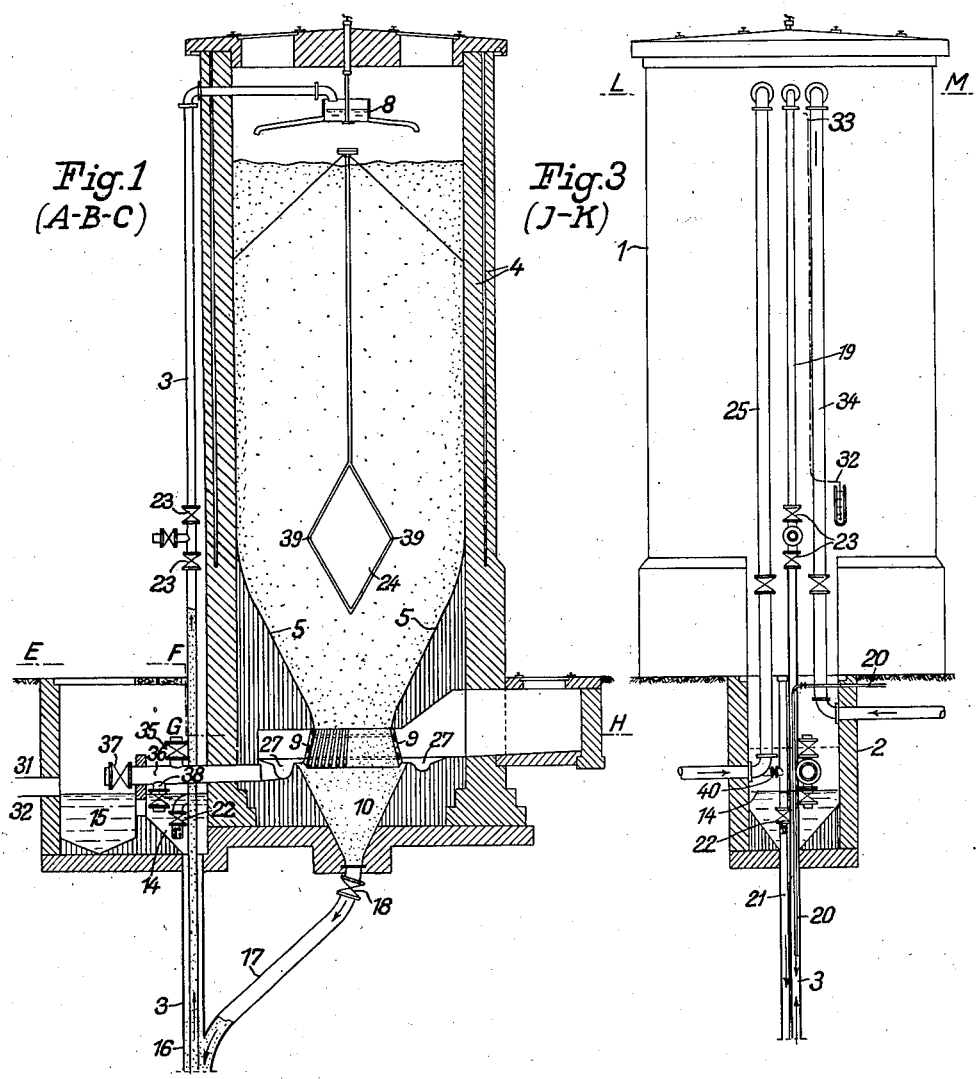

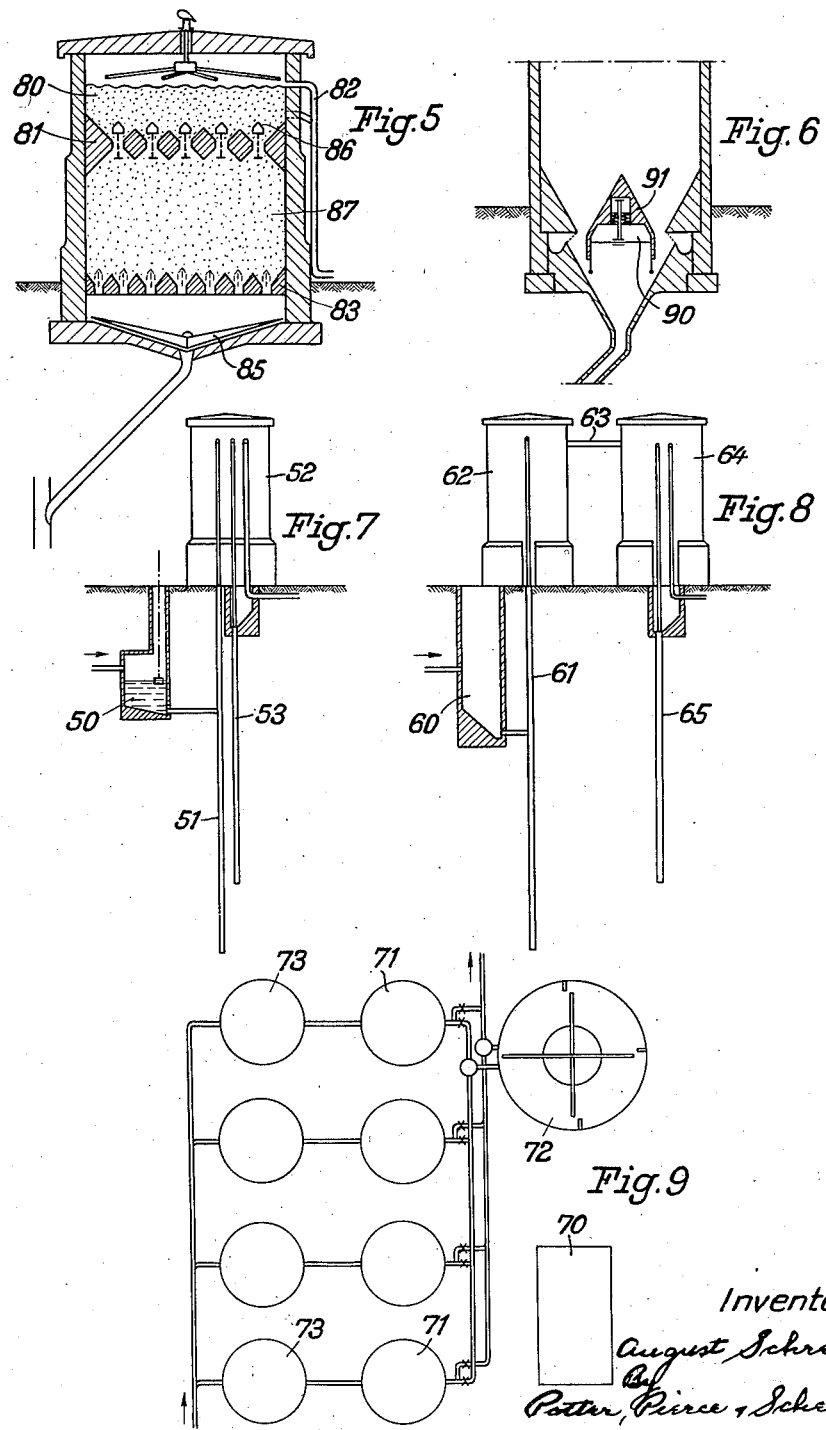

Patented May 16, 1944

2,348,854

UNITED STATES PATENT OFFICE 2,348,854

METHOD AND MEANS FOR PURIFYING SEWAGE AND THE LIKE

August Schreiber, Stahnsdorf, Berlin, Germany; vested in the Alien Property Custodian Application November 10, 1939, Serial No. 303,853
In Germany November 24, 1938

8 Claims. (Cl. 210—7)

The present invention relates to methods and means for purifying sewage, other foul waters and the like, and it is more particularly concerned with improved methods and means for the biological purification of sewage and the like.

It is known to use for the biological purification of sewage so-called trickling or percolating bodies, the liquid being fed to the top of these bodies which are formed of comparatively coarse particles of a suitable filling material such as slag, coke, clinker or the like. The sewage, while slowly passing through the body, is acted upon by microorganisms, whereby purification is attained.

It has now been found that the purification may be rendered more efficient and that the cubic capacity of a trickling or percolating body may substantially be increased, if the filling material of the trickling or percolating body is turned over or repiled.

The invention makes possible the use of a substantially finer grade of filling material than was hitherto used for the afore-mentioned purposes.

The step of turning over and repiling has been applied to the filling material of trickling bodies used for the purification of water and similar clear and relatively pure liquids, but this step heretofore has appeared to be inapplicable to the filling material of trickling bodies used for the biological purification of sewage because this process depends upon the action of microorganisms adhering to the surfaces of the filling material. It is known that a trickling body used for the purification of sewage attains its full efficiency only after running for a number of days due to the accumulation of microorganisms on the surfaces of the filling material, and it has been assumed that turning over and repiling would interfere with this desired action. It has been ascertained, however, that the turning over and repiling of the filling material in the trickling body used in the purification of sewage does not interrupt the action of the microorganisms on the sewage because sufficient microorganisms are retained on the filling material to carry on the purifying action. On the other hand, the action of the trickling body is improved by the removal of sludge and other impurities.

It is an object of the present invention to purify sewage and the like biologically, by allowing the sewage to trickle or pass slowly through a body or pile of filling material which is turned over or repiled in the course of the purification process.

In the preferred form of the invention, the withdrawing and repiling of the filling material is carried out at intervals and without interrupting the passage of the sewage through the trickling body.

It is a further object of the invention to purify the portion of the filling material withdrawn from the trickling body, before returning it to the latter.

In the preferred modification of the invention, the filling material which is to be turned over, is drawn off at the bottom of the trickling body, and is then returned to the top surface of the body. The respective portion of the filling material may be added to the sewage, and fed to the top surface of the trickling body, together with the sewage. Before returning the filling material, part of the sludge and other impurities may be separated, for instance by washing the filling material. Or the sludge may be sucked off while the filling material is being turned over. The washing of the filling material may be carried out in a separate tank or within the apparatus which serves for withdrawing and returning the filling material.

The air required for biological purification may be fed through the trickling body in the direction of the sewage or in a counter-stream. The air under pressure serving for turning over the filling material, as well as the air under pressure of the lifting means for the sewage, may be used for this purpose.

The invention is also concerned with improved means for carrying out the improved purification method. These means comprise a container for the filtering or trickling body of a suitable filling material, means for feeding the sewage and for discharging the purified sewage from the trickling body, and means for withdrawing the filling material from, and returning it to, the body.

In the preferred form of the improved apparatus, the means for feeding the sewage serve at the same time for the distribution of the filling material on the top surface of the body, said means may be actuated automatically by the sewage, turbine-like distributors being particularly adapted for that purpose.

For the turning over and the repiling of the filling material, air-lift pumps may be used. Other objects of the invention will be apparent as the description proceeds and when taken in conjunction with the accompanying drawings, representing schematically and by way of example preferred embodiments of the invention.

Figure 1 is a longitudinal section through a purification plant on line ABC of Figure 2.

Figure 2 is a cross-section taken on line EFGH of Figure 1.

Figure 3 is a side-view, partly in section on line JK of Figure 2.

Figure 4 is a cross-section taken on line LM of Figure 3.

Figure 5 is a longitudinal section through a modified structure with a two-step trickling body.

Figure 6 shows a further modified structure of the lower part of the apparatus.

Figure 7 illustrates schematically in an outline-sketch a purification plant of the type described, together with the sewage lifting plant.

Figure 8 shows schematically in an outline-sketch a similar plant as illustrated in Figure 7, however, with the interpolation of means for a mechanical purification.

Figure 9 illustrates an arrangement for the co-ordination of a plurality of trickling bodies with a common purifying or settling tank for after-treatment.

The purification plant according to Figures 1 to 4 comprises the trickling body container 1 and the rinsing pit 2. The wall 4 of the container 1 is provided in its lower portion with gliding face 5 down which the filling material of the trickling body slides during the turnover or repiling process. The even movement of the filling material, e. g. slag, is assisted by the guiding element 24. The latter is preferably designed in the shape of a double cone and is so arranged that its base 39 is on substantially the same level as the starting edge of the gliding face 5. The surface of the lower cone preferably extends parallel with the gliding face. The lower portion of the trickle plant is formed by a funnel 10. Between the latter and the trickling body proper a grate 9 is arranged which is surrounded by a gully 27.

A pipe 25 conducts the sewage to be purified to the upper part of the plant, where it is distributed over the top surface of the trickling body by a rotating distributor 8. The latter is preferably designed in the shape of a rotating sprinkler having several arms differing in length. Then the sewage trickles through the trickling body, and is conducted away by a discharge pipe 36.

A discharge pipe 17 provided with a valve 18 is connected to the lowermost portion of the funnel 10. During the turnover or repiling step, the filling material is delivered through pipe 17 to the air-lift pump pool 16, from where it is fed to the rotating distributor 8 by the air-lift pump 3 through the elevating tube 19 of the air-lift pump, said tube being provided with stop valves 23 and a branch line between said valves.

The rinsing pit 2 is subdivided into a return pit 14 and a sand compartment 15, from which discharge pipes 30 and 31 lead to an additional purifying or settling tank and the preflooder respectively.

For the airing of the purification plant there are provided an upper aeration pipe 34 and a lower conduit 35. For airing the compressed air of the sewage lifting device or of the filling material turnover pump may be used. It is also possible to use the air from the mechanical preliminary purification for the airing of the biological trickling body. It is advisable to control the air supply of the trickling body by means of a pressure measuring instrument 32 which, in the form of a manometer as shown, is connected to the interior of the body at 33 (see dotted line in Fig. 3).

If the purifying effect of the trickling body decreases, or if the pressure indicated at the superatmospheric pressure measuring instrument 32 rises, it is advisable to repile the filling material. For this purpose, the stop valve 18 of pipe 17 is opened, the air-lift pump 3 is connected, and the valves 23 of the elevating-tube conduit 19 are opened. The air-lift pump then withdraws filling material from the lower part of the purification plant and returns the withdrawn material through elevating conduit 19 to the upper part of the plant. Part of the sludge adhering to the filling material is brushed off at grate 9 while the filling material moves downwardly through the interior of the grate. This sludge is then washed off by the sewage which flows to the gully 27 passing through the openings of the grate from the interior to the exterior. The sewage and the sludge are then drained off through pipe 36.

The bulk of the filling material to be turned over is withdrawn through pipe 17. However, at the same time, during this working step, individual particles of the filling material pass through the openings of grate 9 together with the sewage flowing off. It is suitable not to directly conduct, during this period, the sewage from the sewage discharge tube 36 into the sand compartment 15 of the rinsing pit, but to conduct it, by appropriate adjustment of the valve, into the return pit 14. The particles of the filling material separate there and unite in the air-lift pump with the main portion of the filling material, while sludge and sewage, together with the finest particles of the filling material flow over into the sand compartment 15.

In the outer pipe of the air-lift pump 3 containing the elevating-conduit 19 and the air supplying tube 20 of the air-lift pump, a rinsing pipe 21 may be arranged, having stop valve 22 provided with a protecting screen. By means of this pipe additional rinsing water may be supplied to the lower portion of the air-lift pump in order to make sure that the amount of water required for the conveyance of the filling material is always available. The rinsing tube feeds additional rinsing water, if valve 22 is open, from return pit 14, or it may be directly connected to a pressure line of the sewage supply 25, as indicated in Figure 3 at 40. With the pressure line 40 open, the great pressure causes part of the water or sewage in the outer pipe of the air-lift pump to flow through the filling material upwards, thus exerting a washing action on the descending filling material.

Figure 5 shows a trickling body working on the same principle, namely with a turning over and repiling of the filling material. This body, however, is adapted to carry out the method in two steps. The plant is sub-divided into an upper compartment 80 and a lower compartment 87 by an intermediate bottom 81 provided with valves 86 for the passage of sewage, air and filling material. The bottom 83 of the lower compartment 87 is also provided with valves for the passing through of filling material. At 85 a scraper for the filling material is indicated. If with this construction the filling material is to be turned over or repiled, first of all the upper compartment 80, which is most of all silted up, is washed out. To this end, the upper valves 86 of the intermediate bottom 81 are closed, and the filling material in compartment 80 is washed out by means of compressed air and/or liquid under pressure. The sludge is then drawn off through line 82. After this has been done, the filling material is turned over after the same principle as described in connection with Figures 1 to 4. For this purpose, it is necessary to open the valves of the intermediate bottom 81 as well as the valves in the bottom 83. The valves may be actuated for example by air pressure, or in any other suitable way.

Instead of a plant subdivided into two compartments, a plant subdivided into three or more compartments may be provided, in which would be provided a correspondingly increased number of intermediate bottoms.

Figure 6 illustrates a special design of the lower portion of the trickling plant. In the place of the mechanically actuated stop valve 19 designated in Figures 1 to 4, a stop device is provided which keeps the lower-most portion 10 of the plant free from filling material during the normal operation of the plant. This device consists of a bell valve 90 which, for example, may be lifted and lowered by compressed air, said bell valve opening, in the lifted position indicated in Figure 6, a passage for the filling material, while, when the valve is in a lowered position, the discharge and turning over conduit 17 for the filling material is shut off. Part 91 corresponds to guiding element 24 of the structure shown in Figures 1 to 4. The design of the lower part of the purification plant according to Figure 6, has the advantage of no unaired filling material being present in the funnel-like lowermost part, during normal operation of the plant.

In most cases, the sewage arrives on a lower level than that of the inlet into the trickling plant. It is therefore necessary to lift the sewage. In cases like that, a simple and suitable design of the plant is achieved by utilizing for the raising of the sewage the air-lift pump plant for the turning over of the filling material. By doing this, an additional compressor unit is dispensed with. This is schematically indicated in Figure 7. The sewage to be purified flows into a sewage pond 50 and from there into the air-lift pump 51 which lifts it on top of the trickling element 52. The same compressing unit drives the air-lift pump 53 for the turning over of the filling material.

It is also possible to provide for a plurality of smaller plants a common transportable air compressor for the turning over of the filling material.

In the case of provisional purifying plants, the outer walls of the trickling elements may be made of wooden staves held together by iron rings. The bottom and the upper walls, as well as the air-lift pump and the machine house, may be made portable.

In most cases the sewage must be subjected to a mechanical pre-clarification before being biologically purified in a trickling body. Figure 8 shows schematically an appropriate design of such a plant. The fresh sewage flows into a sewage pond 60 from where it is fed to air-lift pump 61 which lifts the sewage to plant 62 for mechanical pre-purification. From there the mechanically pre-purified sewage is conveyed via conduit 63 to the trickling body 64. The air-lift pump 61 for the unpurified sewage and the air-lift pump 65 for turning over the trickling body 64 are actuated by a common air compressor unit.

It is generally advisable to select the size of the trickling body in proportion to the amount of sewage daily to be purified in such a manner that the turning over of the filling material need be undertaken only after long periods of time, say, for example, every fifth or sixth day. During the step of turning over the filling material, or in the case of the arrangement according to Figure 5 during the turning over and the washing out filling material, the purified sewage leaving the purification plant carries considerable sludge, which makes it advisable to conduct the sewage during these steps not directly to the pre-flooder but to an additional clarification or settling tank. During the remaining working operations of the purifying plant, however, this is in most cases not necessary. A plant according to the scheme illustrated in Figure 9 will answer this purpose. A number of trickling elements 71 (four of which are indicated in Figure 7) cooperate with a common settling tank 72 for after-treatment. A plant 73 for mechanical pre-purification is coordinated to each of the trickling bodies. The discharge of each trickling body may be conducted selectively either to the additional clarifying tank 72, or immediately to the pre-flooder. The discharge conduit is connected in each case in a manner such that the discharge from the trickling body just about to be repiled is fed to the additional clarifying tank 72, whereas the discharge of the remaining, normally working trickling bodies, is conducted away without passing the additional clarifying tank. At 70 is indicated schematically an engine-house.

Instead of delivering to an additional clarifying tank the portion of the sewage, which accumulates during the turning-over step and thus still carries considerable quantities of sludge, this relatively small portion of the total amount of accumulating purified sewage may be returned to the mechanical pre-clarifier usually used to filter out coarse impurities prior to the biological purification step, thus making it possible to operate without an additional clarifying tank for the biologically purified sewage.

Instead of withdrawing and repiling the filling material at intervals the plant may be also operated by continuously carrying through this measure.

Volcanic gravel, light chemical slag, stone splinters and the like may be for example used as filling material. There is, however, a great variety of other suitable materials as is known to the man skilled in the art.

The method of repiling brings about an exceedingly great increase in the output of the purifying plant. While it was hitherto possible to purify in the customary trickling bodies a quantity of sewage per day which corresponded approximately to the simple or twofold volume of the trickling body, it is possible when using the methods of this invention, to purify for example an amount of sewage corresponding to the tenfold volume of the trickling body within a day. Under favourable conditions, it is even possible to increase the quantity of sewage to the thirty-fold volume of the trickling body per day.

The invention allows the use of filling material of considerably smaller pieces, or finer grade than was hitherto used for the purification of sewage. For example, for sewage purifying plants with a volume of 11 to 12 cubic meters, filling bodies have been found to be suitable in which the largest dimension of the single particle was between 5 to 10 mm. However, even finer granulation may be used. Hitherto, fine granulations like that were regarded as unsuitable in sewage purification, because when using the customary filling material in a finely granulated state without the method of turning over and repiling, silting up and processes of decay took place which gradually destroyed the efficiency of the sewage purifying plant.

In order to increase the effect of purification and to facilitate the drawing off of the sludge, additional substances may be admixed with the filling material during the turning over, which cause neutralization, flocculation and/or binding of substances to be removed from the sewage, more particularly of such of the impurities which are present in the sewage in excess. For example, if purifying chemical sewage containing sulfuric acid, it is recommended to add during the turning over to the withdrawn part of the filling material lime-stone splinter which is then fed to the trickling body, when repiling the filling material and is decomposed in the trickling body, while fixing the sulfuric acid. When the turning over is repeated, the decomposed splinter may be replaced by adding a fresh supply of lime-stone splinter.

I claim:

1. Method of biologically purifying sewage and the like which comprises percolating the sewage downwardly through a mass of promiscuously deposited particles of solid filling material carraying deposited thereon microorganisms which act on the sewage, withdrawing part of the filling material from the base of said mass, screening out part only of the sludge contained in the mass and carried on the surfaces of the withdrawn particles, adding the withdrawn particles to fresh sewage to be purified, and delivering said withdrawn particles to the upper surface of said mass in a mixed stream of air and untreated sewage.

2. Method of biologically purifying acidulous sewage and the like which comprises percolating the sewage downwardly through a mass of promiscuously deposited particles of solid filling material carrying deposited thereon microorganisms which act on the sewage, withdrawing a part of said filling material from the base of said mass, adding limestone to said withdrawn part of the filling material for improving the purifying action of said filling material on the sewage, and returning the withdrawn filling material together with the added limestone to the top of the mass.

3. Method of biologically purifying sewage and the like which comprises percolating the sewage downwardly through a mass of promiscuously deposited particles of solid filling material, introducing air under pressure into said body, measuring the air pressure within said mass, withdrawing part of the filling material from the base of the mass and replacing it at the top of the mass when said air pressure above the mass exceeds a predetermined value.

4. Method of biologically purifying sewage and the like which comprises percolating the sewage downwardly through a mass of promiscuously deposited particles of solid filling material, periodically withdrawing the lower part of said mass and repiling it at the top of said mass, eliminating part only of the sludge contained within said mass during said withdrawing and repiling operation, mixing the sewage which leaves the mass during the withdrawing and repiling operation with fresh sewage and returning the mixture to the top of said mass.

5. A plant for the biological purification of sewage and the like comprising a percolating mass formed of promiscuously deposited particles of solid filling material, the average dimension of the individual particles of filling material ranging between 5 and 10 millimeters, means for delivering sewage to the top of said percolating mass, means for withdrawing liquid which has percolated downwardly through said trickling body, a sump for receiving filling material withdrawn from the bottom of said mass and an air-lift for elevating the said material and depositing it on top of the mass.

6. Apparatus as defined in claim 5, comprising means for supplying additional liquid to the sump of the air-lift.

7. A plant for the biological purification of sewage and the like comprising a closed container, a percolating mass formed of promiscuously deposited particles of solid filling material in said container, means for delivering sewage to said percolating mass, means for withdrawing liquid which has passed through said percolating mass, means for introducing air under pressure into said container above the mass, means for withdrawing the lower part of the filling material constituting said mass and repiling it above said mass, and means for measuring the air pressure within the container and above said mass.

8. A plant for the biological purification of sewage and the like comprising a closed container, a percolating mass formed of promiscuously deposited particles of solid filling material supported within a container the walls of which adjacent the lower end thereof slope inwardly to provide a gliding surface, a sewage feeding device, a rotating spraying device cooperating with said feeding device for distributing sewage and filling material on the top surface of said mass, a guiding member within said container having a sloping surface cooperating with said gliding surface to promote even movement of said particles therebetween, a grate supporting the bottom of said mass, an air-lift for withdrawing filling material from the bottom of said mass and for returning said withdrawn filling material to the top of said mass, valve means located between the suction side of said air-lift and said container, a draining line for withdrawing liquid from said container adjacent said grate, and means for indicating the pressure within said container above said percolating mass.

AUGUST SCHREIBER.